(12) United States Patent
Chino et al.

(10) Patent No.: US 11,381,731 B2
(45) Date of Patent: Jul. 5, 2022

(54) IMAGING APPARATUS, IMAGING CONTROL METHOD, AND STORAGE MEDIUM

(71) Applicant: CANON KABUSHIKI KAISHA, Tokyo (JP)

(72) Inventors: Shunsuke Chino, Wako (JP); Ryo Kawasaki, Yokohama (JP); Natsuko Sato, Yokohama (JP); Naoki Maruyama, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/811,454

(22) Filed: Mar. 6, 2020

(65) Prior Publication Data
US 2020/0296296 A1 Sep. 17, 2020

(30) Foreign Application Priority Data

Mar. 15, 2019 (JP) .............................. JP2019-048401
Nov. 11, 2019 (JP) .............................. JP2019-204141

(51) Int. Cl.
*H04N 5/232* (2006.01)

(52) U.S. Cl.
CPC ... *H04N 5/232125* (2018.08); *H04N 5/23218* (2018.08); *H04N 5/23245* (2013.01);
(Continued)

(58) Field of Classification Search
CPC ......... H04N 5/23212; H04N 5/232122; H04N 5/232123; H04N 5/232125;
(Continued)

(56) References Cited

U.S. PATENT DOCUMENTS 10,178,300 B2 * 1/2019 Rivard ............... H04N 5/23212
2002/0080242 A1 6/2002 Takahashi et al.
(Continued)

FOREIGN PATENT DOCUMENTS

EP 0984319 A1 3/2000
JP H11190864 * 7/1999
(Continued)

OTHER PUBLICATIONS

Extended European Search Report issued by the European Patent Office dated Sep. 11, 2020 in corresponding EP Patent Application No. 20162323.8.

*Primary Examiner* — Paul M Berardesca
(74) *Attorney, Agent, or Firm* — Carter, DeLuca & Farrell LLP

(57) ABSTRACT

In order to provide a tilt control device capable of performing tilt control optimal at a high speed by controlling both a focus position and a tilt angle even when a scene changes such as in a case in which a subject changes, there is provided an imaging apparatus including a tilt control unit that performs tilt control by driving at least one of an imaging device and an imaging optical system, a focus lens driving unit that drives a focus lens, and a control unit that has a plurality of control modes for performing focus correction using at least one of the tilt control unit and the focus lens driving unit and selects one of the plurality of control modes in accordance with the number of subject areas displayed on an image screen.

13 Claims, 13 Drawing Sheets

(52) U.S. Cl.
CPC ... *H04N 5/23299* (2018.08); *H04N 5/232127* (2018.08); *H04N 5/23206* (2013.01)

(58) Field of Classification Search
CPC .......... H04N 5/232127; H04N 5/2259; H04N 5/23299; H04N 5/23218; H04N 5/23219; H04N 5/23245; G03B 5/06; G03B 5/08; G03B 2205/0023; G03B 13/32–36; G02B 7/28–40

See application file for complete search history.

(56) References Cited

U.S. PATENT DOCUMENTS

| | | | |
|---|---|---|---|
| 2008/0165272 A1* | 7/2008 | Toguchi | H04N 5/23212 348/348 |
| 2013/0342752 A1* | 12/2013 | Sugawara | H04N 5/23212 348/349 |
| 2017/0180618 A1* | 6/2017 | Georgiev | H04N 13/232 |
| 2017/0272658 A1* | 9/2017 | Ito | G03B 13/36 |
| 2019/0098202 A1 | 3/2019 | Maruyama | |
| 2019/0199912 A1* | 6/2019 | Nagano | H04N 5/23293 |
| 2020/0137313 A1 | 4/2020 | Sato et al. | |
| 2020/0191563 A1 | 6/2020 | Sato | |

FOREIGN PATENT DOCUMENTS

| | | |
|---|---|---|
| JP | H11190864 A | 7/1999 |
| JP | H11242154 A | 9/1999 |
| JP | 2003185902 A | 7/2003 |
| JP | 2008205569 A | 9/2008 |
| JP | 2015230414 A | 12/2015 |

\* cited by examiner

IMAGING APPARATUS, IMAGING CONTROL METHOD, AND STORAGE MEDIUM

BACKGROUND OF THE INVENTION

Field of the Invention

The present invention relates to an imaging apparatus and the like capable of performing tilt control.

Description of the Related Art

Conventionally, there are cases in which passersby on the roadside are monitored, or vehicles or number plates thereof are imaged by installing a monitoring camera at a high place such as under the eaves and directing an optical axis of the camera obliquely downward. In such cases, since the optical axis of the camera is obliquely downward, a focused plane that is in focus when imaging is performed is a plane vertical to the optical axis and does not coincide with an imaging plane of a subject that is a target for actual imaging in many cases.

For this reason, an area that is in focus is a part of the screen, and other areas are out of focus.

Regarding such a problem, an imaging apparatus to which the Scheimpflug principle for broadening the range of the depth of field by performing control of relatively inclining a lens or an imaging device (hereinafter referred to as tilt control) is applied is generally known.

However, when tilt control at a predetermined angle is performed for both of a subject at a short distance and a subject at a long distance, there may be differences between heights of positions of the subjects, differences between heights of the subjects themselves, or the like, and therefore there may be a plurality of tilt angles for focusing both of the subject at a short distance and the subject at a long distance. For this reason, tilt control for focusing on both of subjects positioned at a short distance and subjects positioned at a long distance cannot be performed with only one tilt angle. It is important for a monitoring camera to recognize subjects from a short distance and a long distance.

In addition, when a position of a subject changes, it is necessary to perform appropriate tilt control in accordance with the change of the position of the subject. In such a case, although one subject among a plurality of subjects may be focused on by controlling only the tilt angle, subjects positioned in a plurality of areas cannot be focused on in that way. For this reason, it is necessary not only to change the tilt angle but also to control a position of a focus lens.

In Japanese Patent Laid-Open No. 11-242154, a technology is described in which focus information of a plurality of areas is acquired within an imaging area, auto focusing is performed using the focus information within a predetermined period, and tilt control and auto focusing are performed at subsequent timings.

However, in the imaging apparatus described in Japanese Patent Laid-Open No. 11-242154, tilt control and auto focusing cannot be simultaneously controlled. Thus, after auto focusing is performed, tilt control is performed in that state, and therefore considerable time is required for both the auto focusing and the tilt control, so that there is a problem that it is difficult to follow the change of position of the subject in real time.

An object of the present invention is to provide an imaging apparatus capable of performing optimal tilt control at a high speed by optimizing focus lens driving and tilt control even in a case in which a subject changes or the like.

SUMMARY OF THE INVENTION

In order to achieve the object described above, according to one aspect of the present invention, there is provided an imaging apparatus including: a tilt control unit that performs tilt control by driving at least one of an imaging device and an imaging optical system; a focus lens driving unit that drives a focus lens; and a control unit that has a plurality of control modes for performing focus correction using at least one of the tilt control unit and the focus lens driving unit and selects one of the plurality of control modes in accordance with the number of subject areas on an image screen.

Further features of the present invention will become apparent from the following description of exemplary embodiments with reference to the attached drawings.

BRIEF DESCRIPTION OF THE DRAWINGS

FIG. 10 is a diagram illustrating an example of a representative plane desired to be focused on in a case in which there is no subject or the like.

DESCRIPTION OF THE EMBODIMENTS

Hereinafter, preferred embodiments of the present invention will be described in detail using embodiments with reference to the attached drawings.

Embodiment 1

Figure 1:
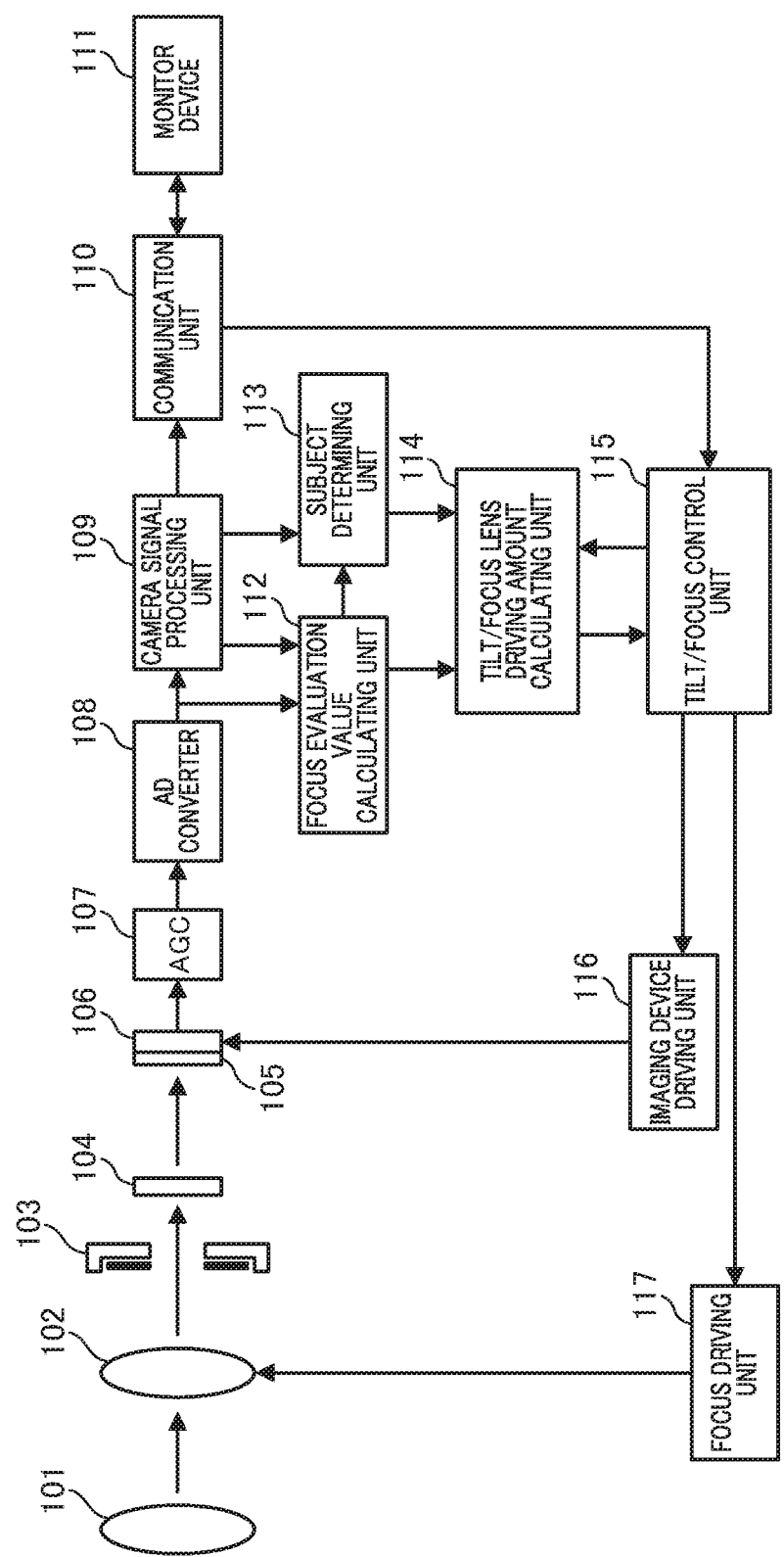
FIG. 1 is a block diagram illustrating an example of the configuration of an imaging apparatus according to Embodiment 1 of the present invention.

FIG. 1 is a block diagram illustrating the configuration of an imaging apparatus according to Embodiment 1 of the present invention.

A lens unit that is an imaging optical system according to this embodiment includes a zoom lens 101 that changes a focal distance by moving in the direction of an optical axis, a focus lens 102 that performs control of focus by moving in the direction of the optical axis, and a diaphragm unit 103 that adjusts an amount of light entering on an imaging device 106. The imaging optical system illustrated in FIG. 1 is one example, and the zoom lens 101, the focus lens 102, and the diaphragm unit 103 need not all be included.

Light passed through the imaging optical system forms a subject image as an optical image on an imaging device 106 through a bandpass filter (hereinafter referred to as a BPF) 104 and a color filter 105.

The BPF 104 may be selectively retracted from an optical path of the imaging optical system. A subject image is photoelectrically converted by the imaging device 106, whereby an imaging signal is formed.

An analog imaging signal output from the imaging device 106 is gain adjusted by auto gain control (AGC) 107, is converted into a digital signal by an AD converter 108, and then is input to a camera signal processing unit 109.

The camera signal processing unit 109 performs various kinds of image processing (for example, gamma conversion, white balance adjustment, and the like) for a digital imaging signal, thereby generating a video signal. By displaying this video signal as an image on a display unit included in a monitor device 111, an image screen can be displayed as shown in FIGS. 6, 7, 10, and 12.

The video signal is output to at least one monitor device 111 through a network using wired or wireless communication via a communication unit 110. In addition, the communication unit 110 receives a command from an external control device such as an external PC included in the monitor device 111 and transmits a control signal corresponding to the command to a tilt/focus control unit 115 of the imaging apparatus.

In this embodiment, a system including the monitor device 111 and the like will be referred to as an imaging apparatus. In FIG. 1 of this embodiment, members other than the monitor device 111 are housed inside one casing and configure a security camera.

A focus evaluation value calculating unit 112 receives pixel values or luminance values of RGB from the AD converter 108 or the camera signal processing unit 109 and calculates a focus evaluation value used for tilt control or auto focusing (hereinafter referred to as AF). For example, by dividing an image screen displayed on a display unit of the monitor device 111 into a plurality of subject areas, the focus evaluation value is calculated on the basis of contrast and high-frequency components of the image for each subject area. The focus evaluation value may be acquired using any method such as a phase difference AF method, an infrared AF method, or the like as long as the focus evaluation value can be used for focus adjustment.

In addition, for example, a display unit for displaying an image screen may be selectively connected to an output side of the camera signal processing unit 109 and may allow the image screen to be monitored also on the security camera side.

A subject determining unit 113 performs an image recognition on a video signal from the camera signal processing unit 109 and detects a specific subject on the image screen. The specific subject is a subject (for example, a person, a face, a vehicle, or the like) that is arbitrarily designated by a user or is set as a default in advance but is not limited to such examples.

A focus evaluation value from the focus evaluation value calculating unit 112 and a subject recognition result from the subject determining unit 113 are input to a tilt/focus lens driving amount calculating unit 114. In addition, the tilt/focus lens driving amount calculating unit 114 calculates a tilt angle and a focus position that are optimal to a scene based on the focus evaluation value, the subject recognition result, and the tilt angle information and the focus position information from the tilt/focus control unit 115. The tilt angle and the focus position are controlled by transmitting the tilt angle and the focus position that have been calculated to the tilt/focus control unit 115.

The tilt/focus control unit 115 has a CPU as a computer and executes various operations of the entire apparatus as a control unit on the basis of a computer program stored in a memory that is not illustrated in the drawing. The tilt/focus control unit 115 performs focus lens driving in AF or manual focus (hereinafter referred to as MF) on the basis of a direction from an external control device such as the external PC through the communication unit 110. In addition, the tilt/focus control unit 115 receives the current lens position information from an imaging device driving unit 116 and a focus driving unit 117, and transmits the current position to the tilt/focus lens driving amount calculating unit 114. Furthermore, the tilt/focus control unit 115 performs drive control by sending the tilt angle and the focus position calculated by the tilt/focus lens driving amount calculating unit 114 to the imaging device driving unit 116 and the focus driving unit 117.

The imaging device driving unit 116 functions as a tilt control unit (a tilt angle control unit) and tilts the imaging device 106 on the basis of a tilt angle designated by the tilt/focus control unit 115. By inclining the imaging device 106, a tilt angle that is an angle between the imaging device 106 and a plane orthogonal to the optical axis of the imaging optical system is changed.

In this embodiment, a rotation axis (a tilt axis) for tilting the imaging device 106 is arranged to pass through the center of the imaging plane in a horizontal direction (the longitudinal direction of the imaging device), around which the imaging device 106 is controlled to tilt relative to the imaging optical system.

In this connection, in order to perform tilt control, instead of tilting the imaging device, some lenses of the imaging optical system may be controlled to tilt relative to the imaging device.

The focus driving unit 117 controls the position of the focus lens 102 on the basis of a focus setting position directed from the tilt/focus control unit 115.

Figure 2:
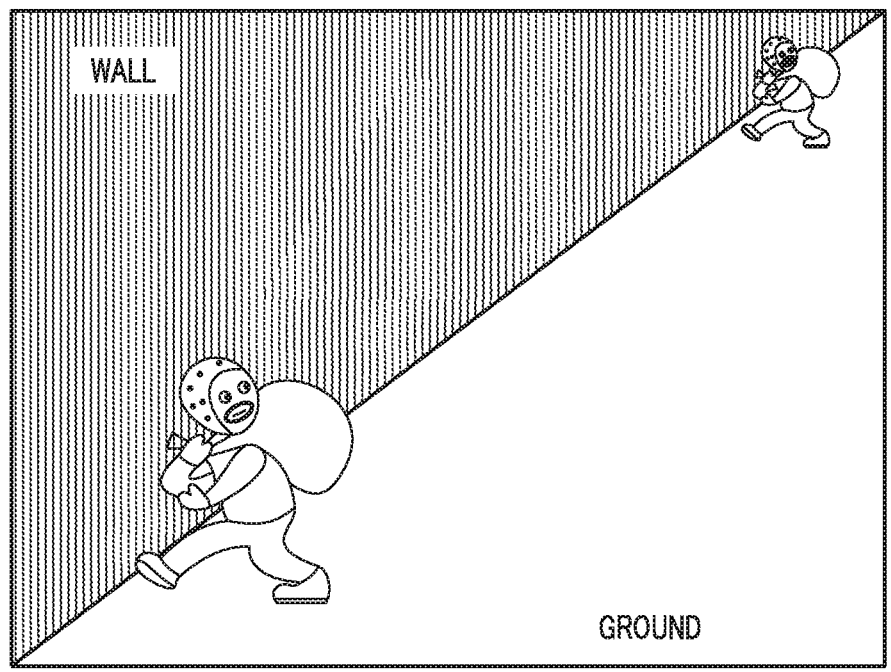
FIG. 2 is a diagram illustrating an example of a scene on which tilt control is performed.

As an example of a scene on which tilt control is performed, a scene illustrated in FIG. 2 will be assumed. FIG. 2 is a diagram illustrating an example of a scene on which tilt control is performed.

A case in which there are subjects at a short distance and a long distance is illustrated. In a focusing operation in AF or MF without performing tilt control, either a subject positioned at a short distance or a subject positioned at a long distance is focused on.

Figure 3:
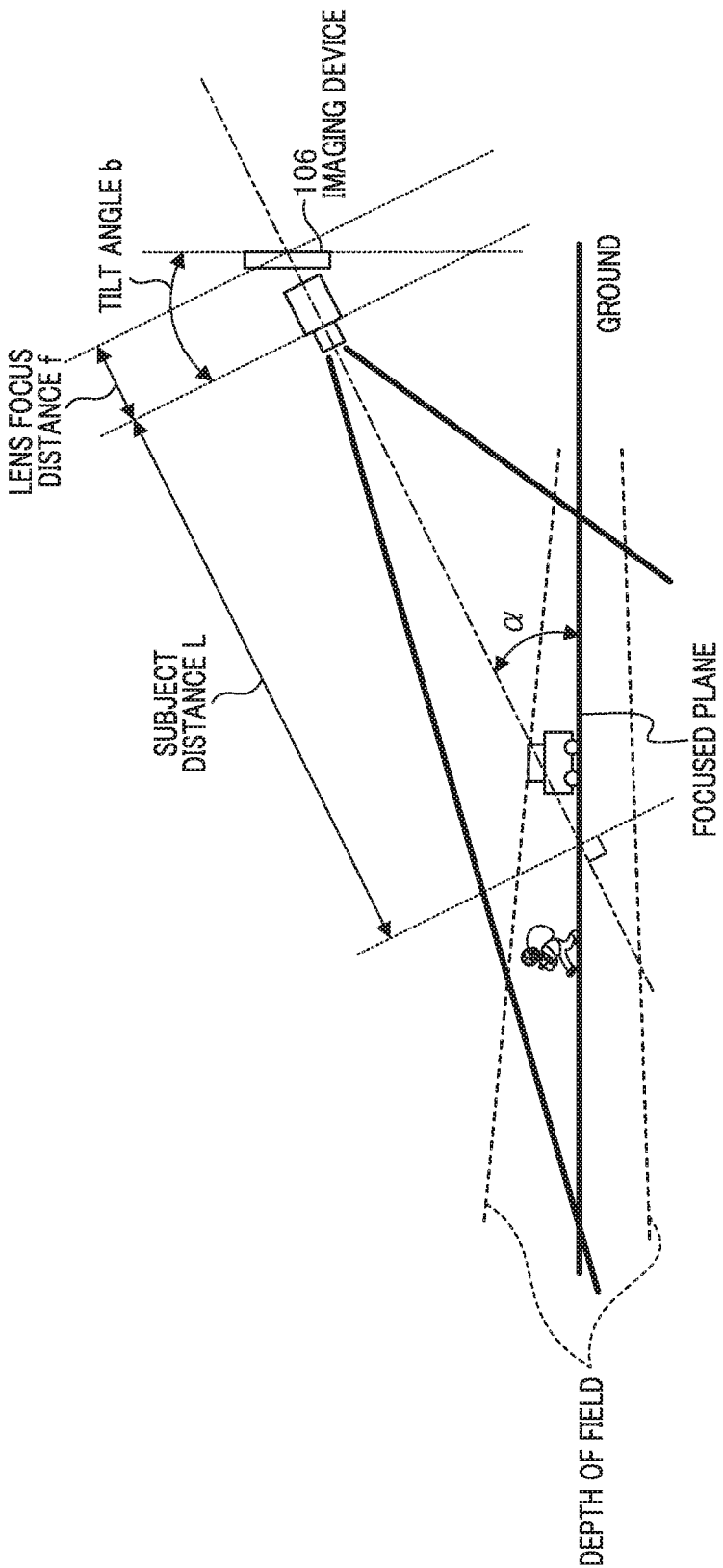
FIG. 3 is a diagram illustrating a tilt control method.

FIG. 3 is a diagram illustrating a tilt control method, and tilt control, as illustrated in FIG. 3, is control for setting a (focused) plane that is focused on to be in parallel with a horizontal plane such as the ground, for example, by tilting the imaging device 106. In this way, with respect to a plane parallel to the ground, a subject positioned at a short distance and a subject positioned at a long distance enter the depth of field and can remain in focus.

A tilt angle b is calculated using the following Equation (1) based on the Scheimpflug principle.

$$b = \arctan(f/(L \tan \alpha)) \qquad \text{(Equation 1)}$$

Here, f is a focal distance, L is a subject distance, and $\alpha$ is an angle between an optical axis and a focused plane.

Figure 4:
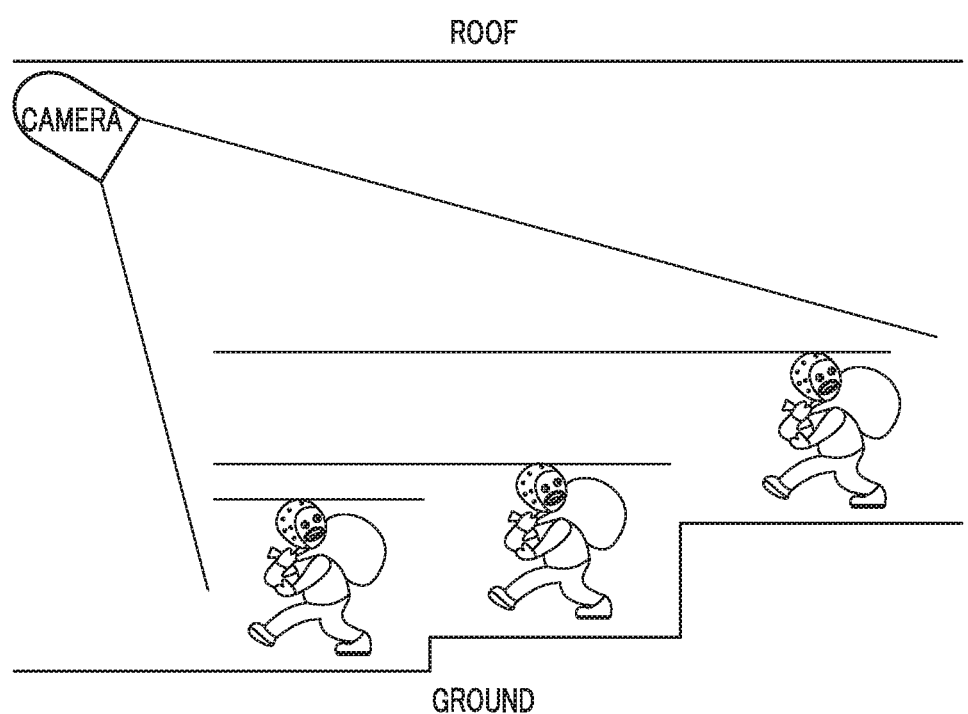
FIG. 4 is a diagram illustrating Example 1 in which a plurality of tilt angles are present.
Figure 5:
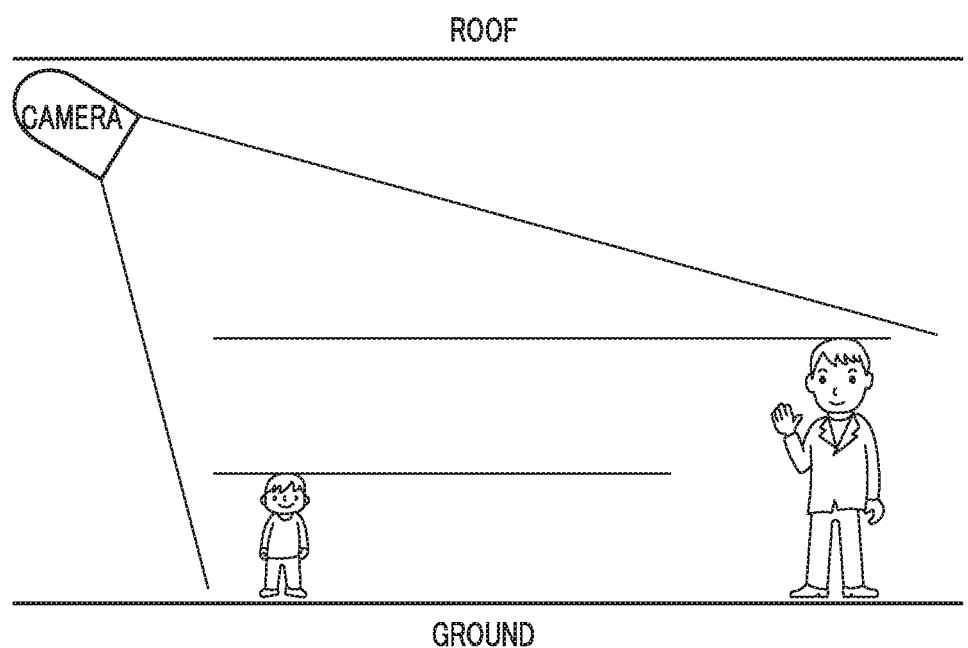
FIG. 5 is a diagram illustrating Example 2 in which a plurality of tilt angles are present.
Figure 6:
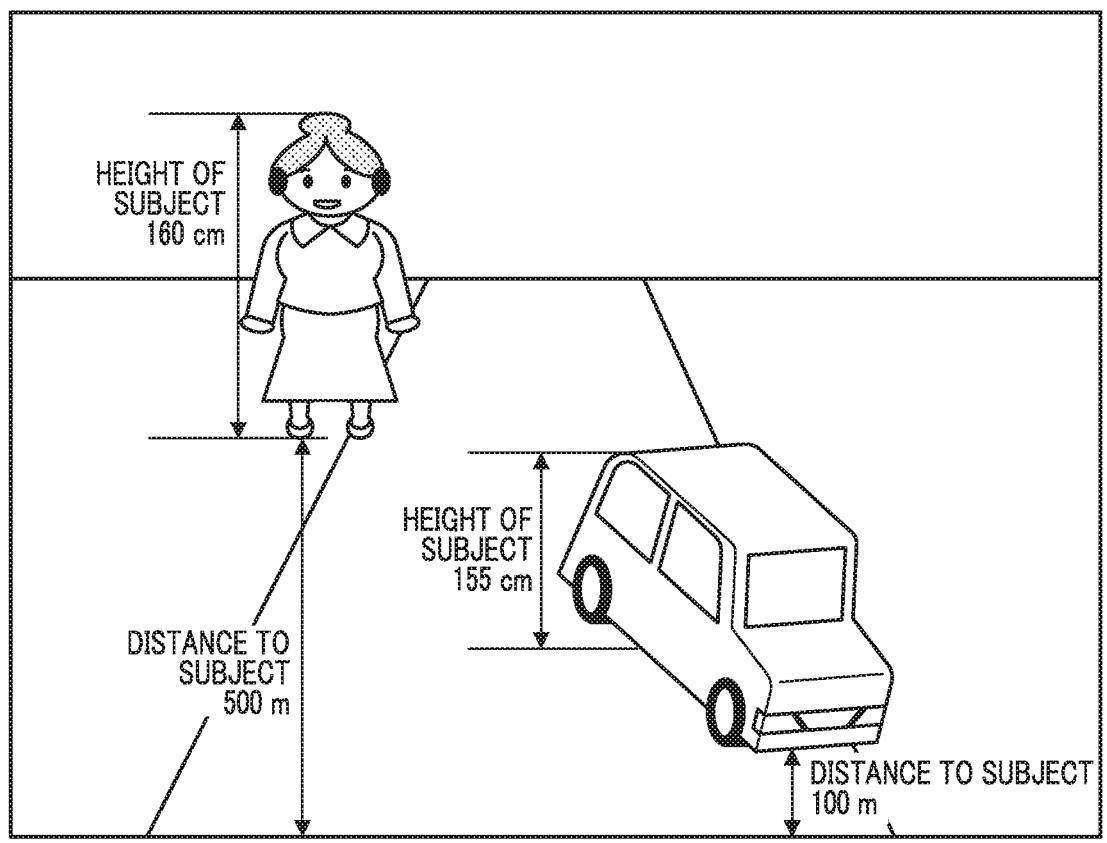
FIG. 6 is a diagram illustrating an example of an imaging scene.
Figure 7:
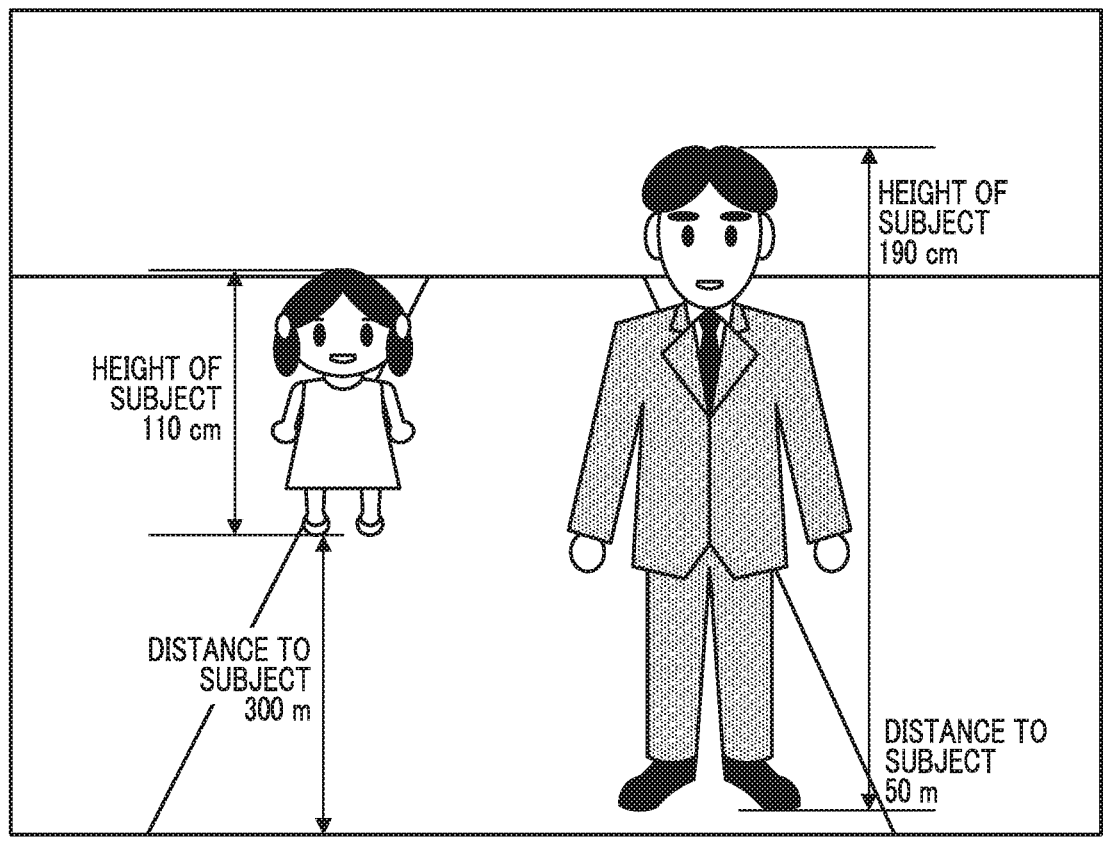
FIG. 7 is a diagram illustrating another example of an imaging scene.

FIGS. 4 and 5 are diagrams illustrating Examples 1 and 2 in which a plurality of optimal tilt angles are present. In a case in which a height of a surface on which a subject is walking changes as illustrated in FIG. 4, a case in which a plurality of subjects having different heights are present as illustrated in FIG. 5, or the like, an optimal tilt angle is different for each subject. Similarly, in a case in which a subject positioned at the center of an image screen, corresponding to the center of the imaging device through which a tilt rotation axis passes, is out of focus by AF or MF or the like, an optimal tilt angle is different for each subject. In other words, there are a plurality of optimal tilt angles for the subjects displayed on the image screen. FIGS. 6 and 7 are diagrams illustrating examples of images displayed on the imaged screen, and in a case in which a plurality of subjects having different heights are present at different distances as illustrated in FIGS. 6 and 7 or the like, the subjects may be out of focus.

Furthermore, even in a case in which each subject moves or disappears in accordance with elapse of time, there are cases in which the subjects are out of focus in accordance with the change in the scene in conventional tilt control.

In addition, in a case in which there are a plurality of subjects having different heights, optimal control may not be able to be performed using only tilt control in many cases.

Figure 8:
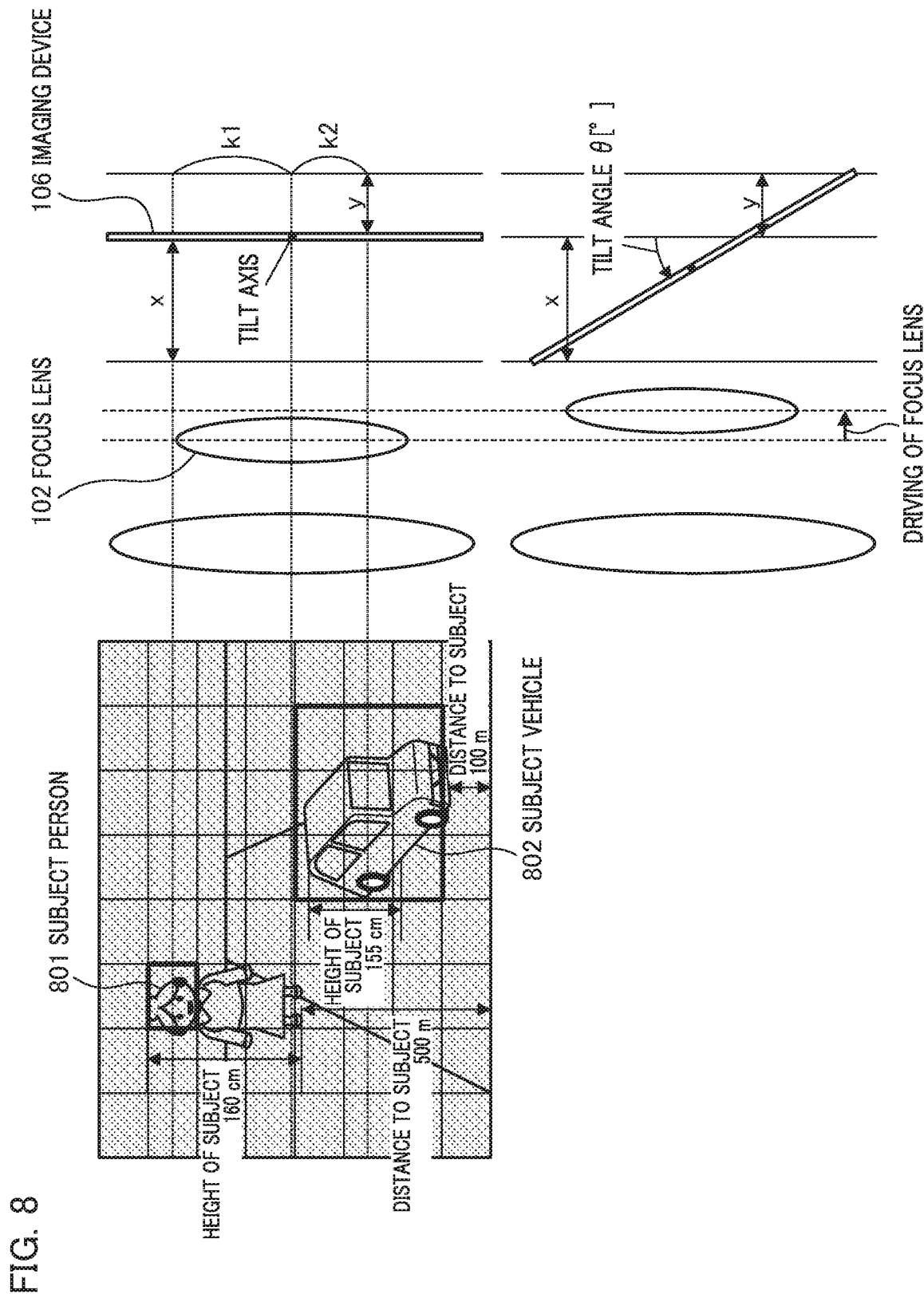
FIG. 8 is a diagram illustrating focus lens driving and tilt control according to Embodiment 1 of the present invention.

One example thereof will be described with reference to FIG. 8. FIG. 8 is a diagram illustrating focus lens driving and tilt control.

A case in which there are a subject person 801 (a first area) and a subject vehicle 802 (a second area) on a screen as target subjects will be considered. A current tilt angle and the position of the focus lens 102 have a positional relation illustrated in an upper part of FIG. 8. Here, x is an amount of focus correction (an amount of defocusing) from an imaging plane of the imaging optical system that should be reduced to be zero for focusing on the subject person 801. In addition, y is an amount of focus correction (an amount of defocusing) from a focal plane of the imaging optical system that should be reduced to be zero for focusing on the subject vehicle 802. In many cases, it may be difficult to focus on both the subject person 801 and the subject vehicle 802 only by performing tilt control.

For this reason, in this embodiment, focus correction using a focus lens and focus correction using tilt control are performed together. An example of a method of calculating driving amounts thereof in this case will be described. As in the upper part of FIG. 8, a distance (an image height) from a tilt axis passing the center of the imaging plane of the imaging device 106 to a subject image will be denoted by k1 [μm] for the subject person 801 and k2 [μm] for the subject vehicle 802. Here, k1 and k2 respectively correspond to the position information of a first area of the image screen and the position information of a second area of the image screen. In addition, an amount of focus correction on an imaging plane according to movement of the focus lens 102 will be denoted by β.

As an example of the calculation of β, there is a method of calculating β from a product of sensitivity of the focus lens 102 and a drive amount of the focus lens 102. On the other hand, amounts of focus correction according to a tilt angle are products of α=tan θ and distances k1 and k2 from the tilt axis to the subject images when the tilt angle is denoted by θ[°].

Thus, the following equations are obtained.

$$x = k1 \times \alpha + \beta \quad \text{(Equation 2)}$$

$$y = k2 \times \alpha - \beta \quad \text{(Equation 3)}$$

By solving the simultaneous equations, the followings are acquired.

$$\beta = (k2 \times x - k1 \times y)/(k1+k2) \quad \text{(Equation 4)}$$

$$\alpha = (x+y)/(k1+k2) \quad \text{(Equation 5)}$$

Accordingly, the tilt angle θ can be calculated using the following equation.

$$\theta = \arctan((x+y)/(k1+k2)) \quad \text{(Equation 6)}$$

In addition, for example, in order to approximately calculate the amount of driving of the focus lens (a focus lens driving amount) γ, it can be calculated using γy=β/(sensitivity of the focus lens). Furthermore, for more accurate calculation, an equation of a higher degree or a polynomial according to sensitivity may be solved.

The method of calculating the focus lens driving amount γ can be variously modified or approximated, or the like, and a calculation method using such a modification, an approximation, or the like may be employed.

Figure 9:
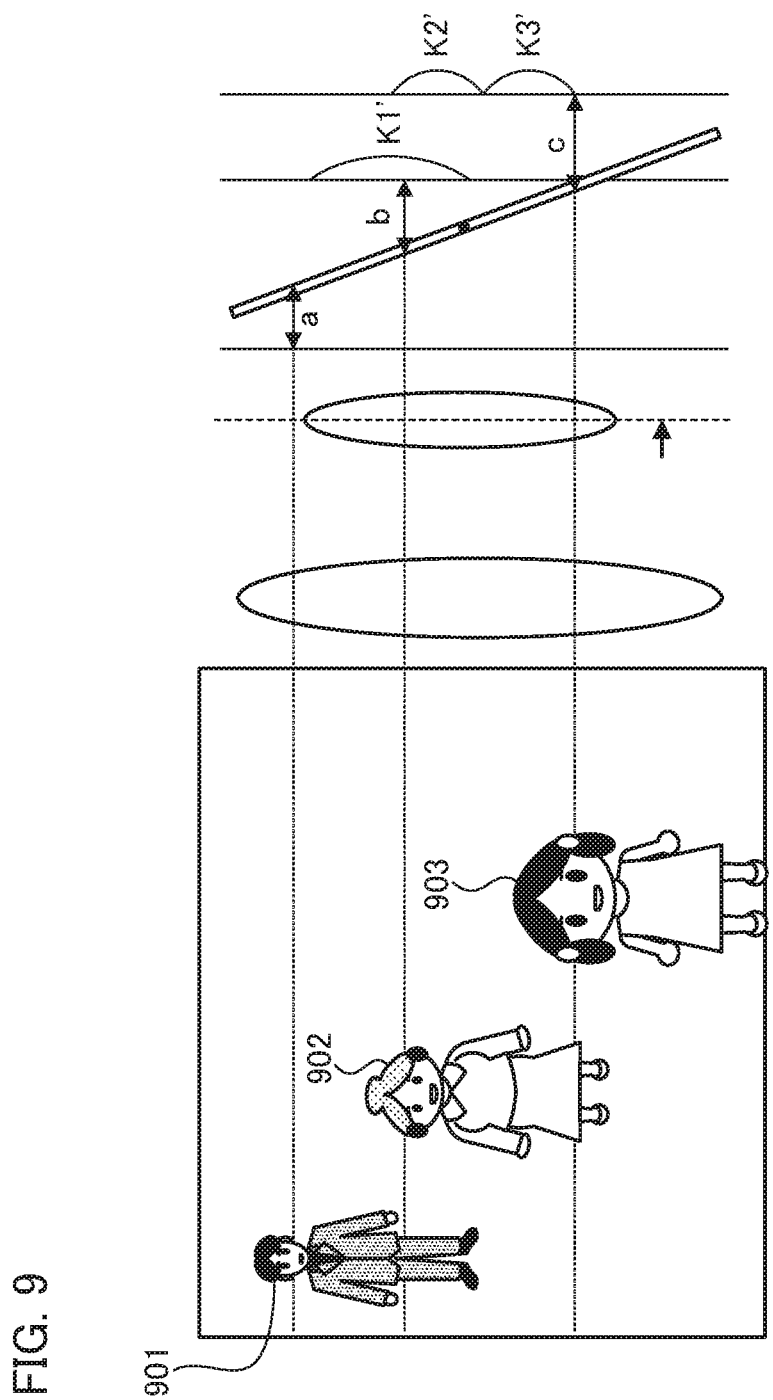
FIG. 9 is a diagram illustrating focus lens driving and tilt control in a case in which there are three or more subjects.

A case in which there are three or more subjects on the image screen will be described. FIG. 9 is a diagram illustrating focus lens driving and tilt control in a case in which there are three or more subjects on the image screen. In a case in which there are subjects positioned at a short distance and a long distance as in FIG. 9, all the subjects may not be focused on by performing only tilt control and focus lens driving.

Amounts of focus correction (defocus amounts; blur amounts) from the focal plane of the imaging optical system for a subject person 901 positioned at a long distance, and a subject person 902 positioned at a middle distance, and a subject person 903 positioned at a short distance will be respectively denoted by a [μm], b [μm], and c [μm].

An example of a control method in this case will be described. First, as a first method, there is a method in which a maximum value of the amounts of focus correction such as a [μm], b [μm], c [μm], and the like is controlled to be a minimum. By performing focus lens driving and tilt control, a maximum value of a [μm], b [μm], and c [μm] is controlled to be a minimum. According to this method, blurring of subjects in the scene as in FIG. 9 can be suppressed to be a minimum. As a second method, there is a method in which a permissible focus range, that is a depth of field, is calculated, and the amounts of focus correction such as a [μm], b [μm], and c [μm] are controlled to be within the depth of field.

The depth of field is a value that is determined using a cell pitch per pixel of the imaging device 106 and an aperture value. When the depth of field is denoted by FΔ, it can be calculated by solving the following equations.

$$F\Delta \geq k1' \times \alpha + \beta \quad \text{(Equation 6)}$$

$$F\Delta \geq k2' \times \alpha + \beta \quad \text{(Equation 7)}$$

$$F\Delta \geq k3' \times \alpha + \beta \quad \text{(Equation 8)}$$

α and β are calculated by solving Equations 6 to 8 described above, and a tilt angle θ and a focus lens driving amount γ is calculated from α and β.

In a case in which a [μm], b [μm], and c [μm] are within the depth of field, a user does not perceive blurring of the image and does not need to make a maximum value of a [μm], b [μm], and c [μm] to be a minimum as in the first method. In a case in which control is performed using the second method, and if a subject to be focused is not within the depth of field, the control for driving using the first method may also be used.

Generally, comparing the depth of fields at a short distance and a long distance, the long-distance side has a larger depth of field for the tilt control, and accordingly, it is also effective to perform tilt control or focus lens driving with a subject at a short distance with priority. For this reason, by using a distance measuring unit that measures a distance to a subject, distances to a plurality of subjects may be measured, and tilt control and focus lens driving may be performed for a subject that is relatively close to the imaging device with priority.

In addition, disappearance may also be considered as a change in the subject. In such a case, there is a possibility of erroneous focusing on a plane of the ground or the like. In addition, since there is also a case where a plane different from a preferable focused plane desired to be focused on may be erroneously set, a method to cope with those cases should be taken into consideration.

Figure 10:
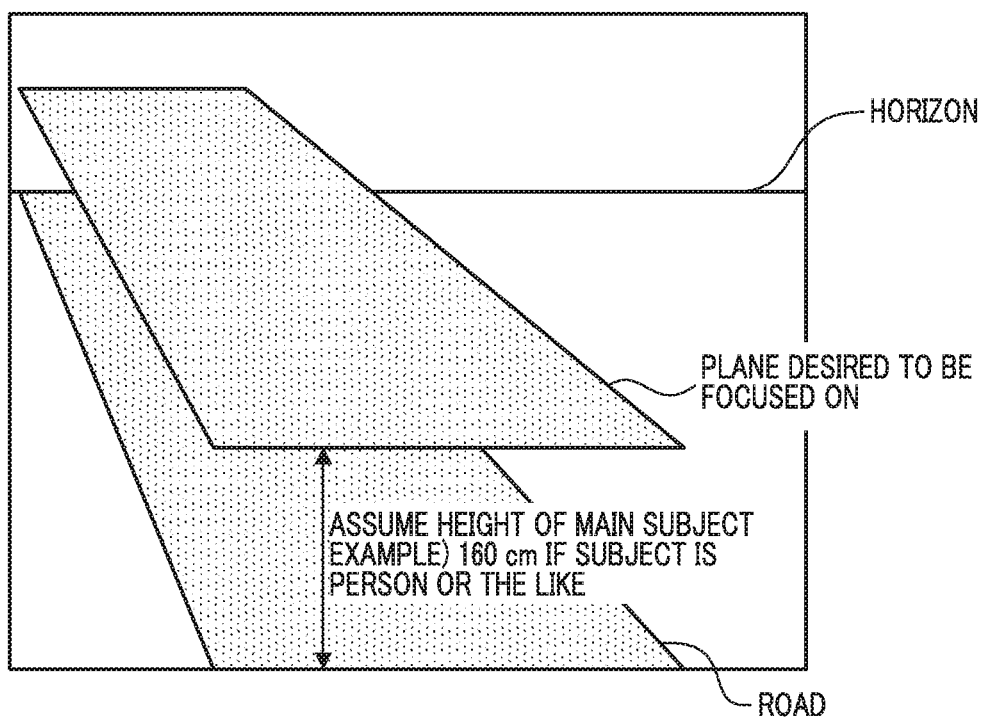

FIG. 10 is a diagram illustrating an example of a representative plane desired to be focused on in a case in which there is no subject or the like. As in FIG. 10, in accordance with a background scene when a security camera is installed and a main target subject of the security camera, for example, a plane desired to be focused on may be set to a plane shifted, for example, by 1.6 m above the ground or the like, assuming the main subject is a person or the like. By performing control such that the plane described above is set, a ratio of a focused area within the screen can be increased. In other words, large blurring can be prevented. A plane desired to be focused on may be a plane that is determined by a user or a plane that is determined in advance. In addition, a method in which, by reading a history from a memory, frequently stopped positions of the focus lens and tilt angles in the past may be obtained, then by weighting them, the positions and the tilt angles suitable to the scene may be realized.

Next, an example of selecting a plurality of control modes according to Embodiment 1 will be described with reference to a flowchart illustrated in FIG. 11.

In this embodiment, there are a plurality of control modes for performing focus correction using at least one of the tilt control unit and the focus lens driving unit described above. In addition, there is a feature in that one of the plurality of control modes is selected in accordance with the number of subject areas displayed on the image screen.

Scanning is performed in S1101. The scanning is control of driving such that the tilt angle of the imaging device 106 or the position of the focus lens 102 is gradually changed in one direction. In S1102, the focus evaluation value calculating unit 112 calculates an evaluation value for each area among a plurality of areas displayed on the image screen during the scanning.

In S1103, the subject determining unit 113 determines areas in which a subject is present. An area in which a subject is present is an area of which an evaluation value calculated for each area in S1102 is high or an area in which a subject to be focused such as a person or a vehicle is found by image recognition.

In S1104, the number of areas in which a subject is present (the number of subject areas displayed on the image screen) is determined. In a case in which the number of subject areas is determined to be one in S1104, a first control mode is selected in S1105, in which focus correction is performed using one of tilt control and focus lens driving such that the area in which a subject is present is focused on.

More specifically, for example, in a case in which there is no subject near the vertical center of the image screen, focus correction is performed using tilt control. In other words, tilt control is performed in a case in which a distance (an image height) to a subject from the vertical center on the image screen is longer than a predetermined value, and focus correction is performed using focus lens driving in a case in which the distance (the image height) to a subject from the vertical center of the image screen is shorter than the predetermined value.

In a case in which the number of areas in which a subject is present is two in S1104, a second control mode is selected in S1106. In the second control mode, focus correction is performed using both tilt control and focus lens driving. More specifically, for example, the amounts of focus correction is calculated such that both the areas in which subjects are present are focused on by using Equations 2 to 5 as described above.

In other words, by using an evaluation value for each area calculated in S1102, the position of the focus lens at which the evaluation value for each area becomes a peak value is acquired, for example, as x and y represented in Equations 2 and 3. k1 and k2 represented in Equations 2 and 3 are acquired on the basis of the position of the area on the image screen. Then, a tilt angle θ and a focus lens driving amount γ are calculated using Equations 4 and 5.

Subsequently, tilt control and focus lens driving are performed based on the tilt angle θ and the focus lens driving amount γ described above.

In this connection, a method for calculating a focus correction amount for each area is not limited to the method described above, and a distance to a subject may be acquired using an external measurement sensor or an image-plane-phase-difference image sensor in which each pixel includes a plurality of photoelectric conversion units having a parallax therebetween.

In a case in which it is determined that the number of areas in which a subject is present is three or more in S1104, similar to S1106, the second control mode is selected in S1107. In other words, focus correction is performed using both the tilt control and the focus lens driving. Here, although the same second control mode is selected, a specific calculation method (calculation algorithm) is different from S1106. As described above, a tilt angle θ and a focus lens driving amount γ are calculated, for example, using Equations 6 to 8 such that a maximum value of the amount of focus correction (the amount of blurring) of the area in which a subject is present becomes a minimum. Then, tilt control and focus lens driving are performed based on the tilt angle θ and the focus lens driving amount γ that have been calculated by the above method.

In this case, control is performed such that the area in which the subject is present comes into a diameter of permissible circle of confusion. Although the process proceeds to Step S1107 in a case in which the number of areas in which a subject is present is equal to or larger than a predetermined number "three", the predetermined number may be, for example, equal to or larger than "four". In such a case, where the number of areas in which a subject is present is two or three, the process proceeds to S1106. As another embodiment, in a case where the number of areas in which a subject is present is equal to or larger than two, the process may proceed to Step S1107, and Step S1106 may be omitted.

In a case in which there is no area in which a subject is present in S1104, in other words, when it is determined that no subject is present on the image screen, a third control mode is selected in S1108, where control is performed such that an amount of focus correction set in advance is used. In other words, the focus lens driving position and the tilt angle are returned to the focus lens driving position and the tilt angle in the past that are immediately before the start of control such as scanning. Alternatively, a most-frequently stopped position in focus lens driving and tilt control in the past may be stored, and focus lens driving and tilt control may be performed using the most-frequently stopped position as a default. In other words, a history of focus lens driving positions and tilt angles in the past and the amounts of focus corrections in the past is stored in a memory, and the focus position and the tilt angle are controlled on the basis of the history information.

In addition, also in a case in which there is no change in the area of the subject, control similar to that of a case in which there is no area in which a subject is present may be performed.

As described above, in Embodiment 1, the number of subject areas on the image screen is automatically determined in S1103. Then, one of a plurality of control modes for focus corrections using at least one of the tilt control unit and the focus lens driving unit is selected in accordance with the number. Accordingly, the subject does not become out of focus depending on a change in the subject, and tilt control and focus lens driving optimal for the situation can be realized.

Embodiment 2

Next, Embodiment 2 of the present invention will be described with reference to FIG. 12. In Embodiment 2, arbitrary areas of a captured image are designated by a user, and a focus position and a tilt angle are controlled.

Figure 12:
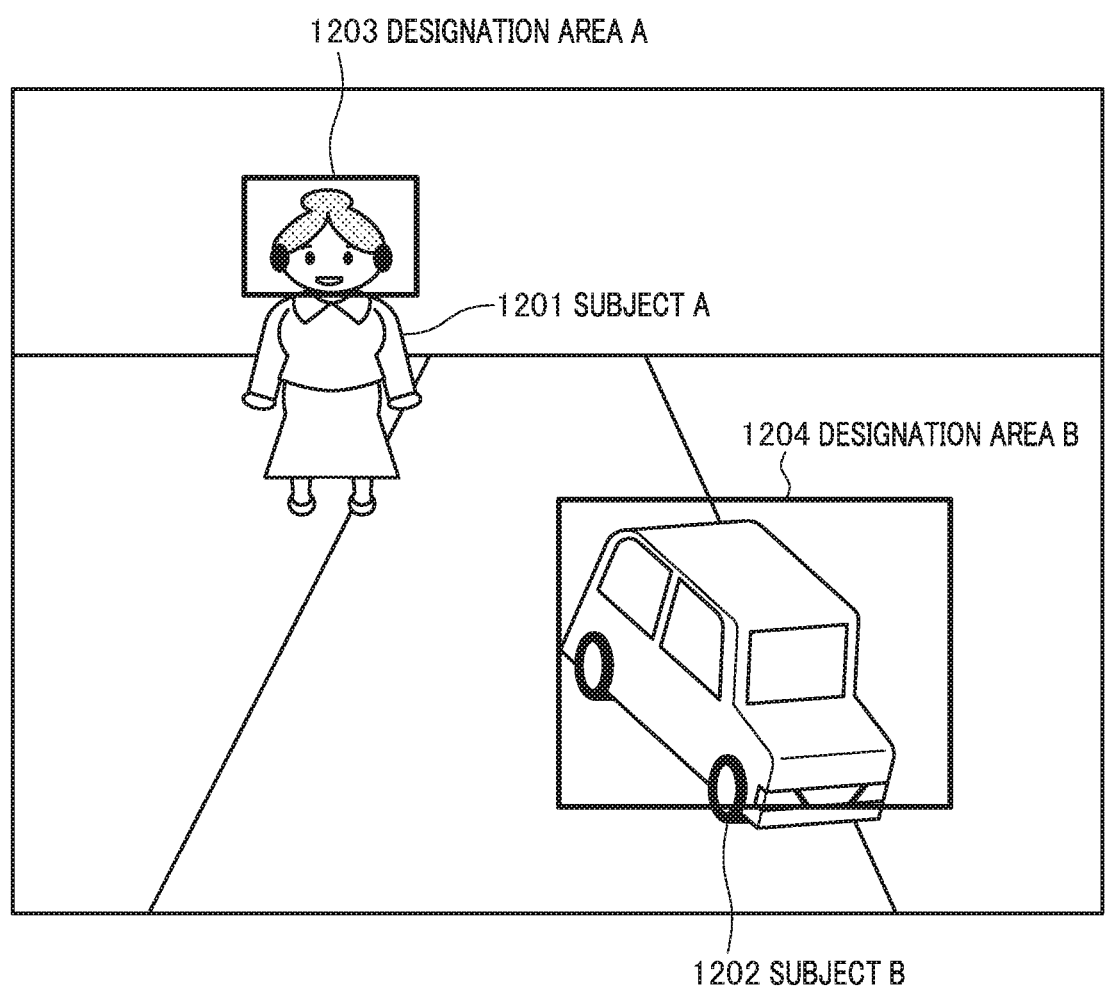
FIG. 12 is a diagram illustrating one example of an imaging scene according to Embodiment 2.

FIG. 12 is a diagram illustrating one example of an imaging scene according to Embodiment 2. For a subject A1201 and a subject B1202 shown in FIG. 12, a user designates these two areas using an area designating unit (a touch panel, a mouse, or the like). In this embodiment, the user sets designation areas by designating an area itself, a corner, a width, a height, and the like of each area using the area designating unit.

In addition, as another method, a predetermined frame having a predetermined size may be displayed on the image screen in advance, and the frame may be moved to an arbitrary position to designate a position and the determination operation is carried out. By using the method as described above, for example, a first designation area 1203 can be easily set, and subsequently, a second designation area 1204 can be also easily set similarly.

Figure 11:
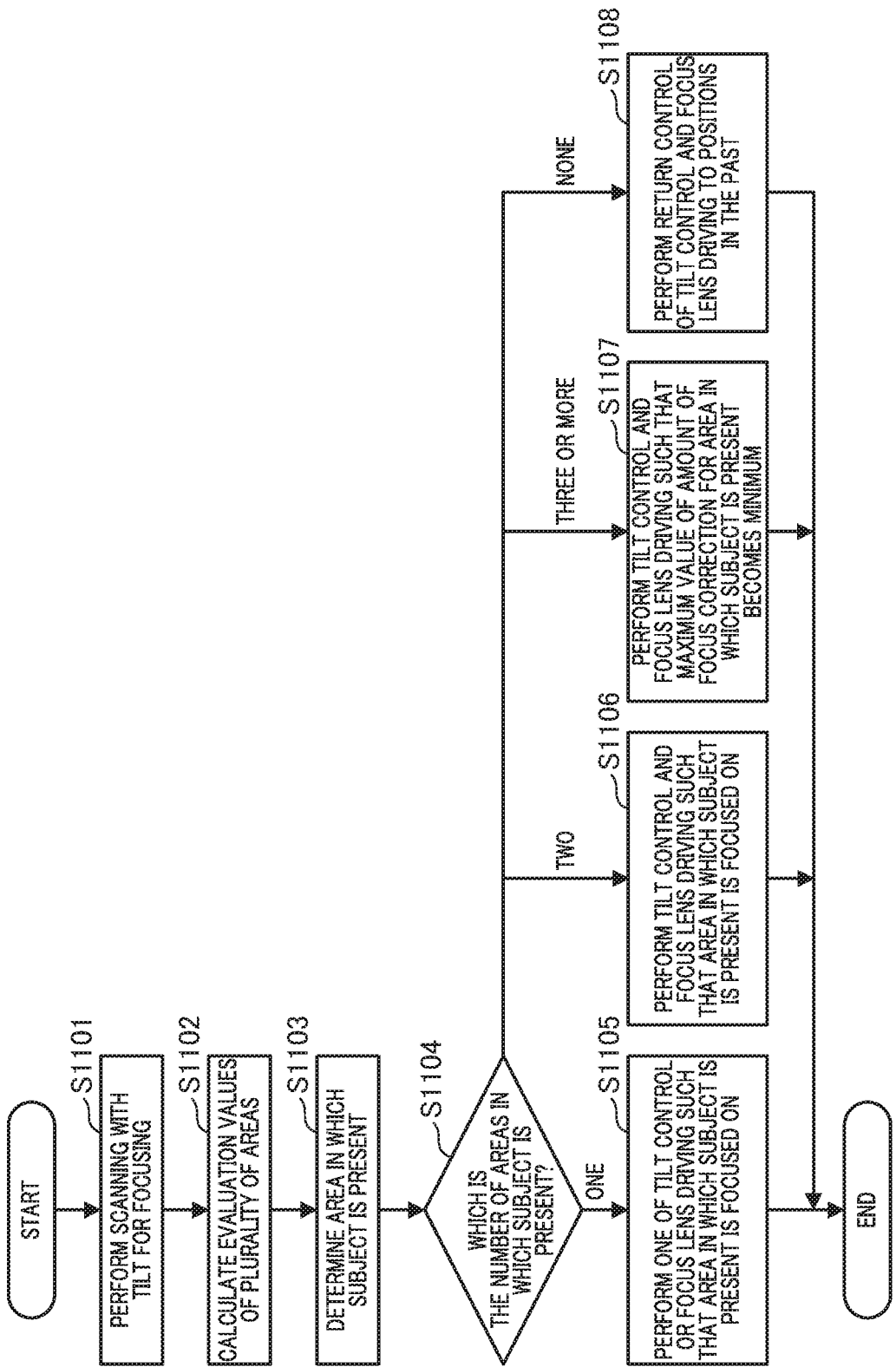
FIG. 11 is a flowchart illustrating a plurality of control modes according to Embodiment 1 of the present invention.

In this way, instead of executing automatic determination of subject areas on the image screen in Steps S1101 to S1103 as illustrated in FIG. 11, subject areas on the image screen may be manually designated by the user. In such a case, the number of subject areas on the image screen that are designated by the user corresponds to the number of areas in which a subject is present in Step S1104.

Embodiment 3

In Embodiment 2, after subject areas on the image screen are manually designated by the user, the number of areas in which a subject is present is determined in Step S1104. However, in Embodiment 3, a tilt angle and a focus position are controlled without determining the number of areas.

Figure 13:
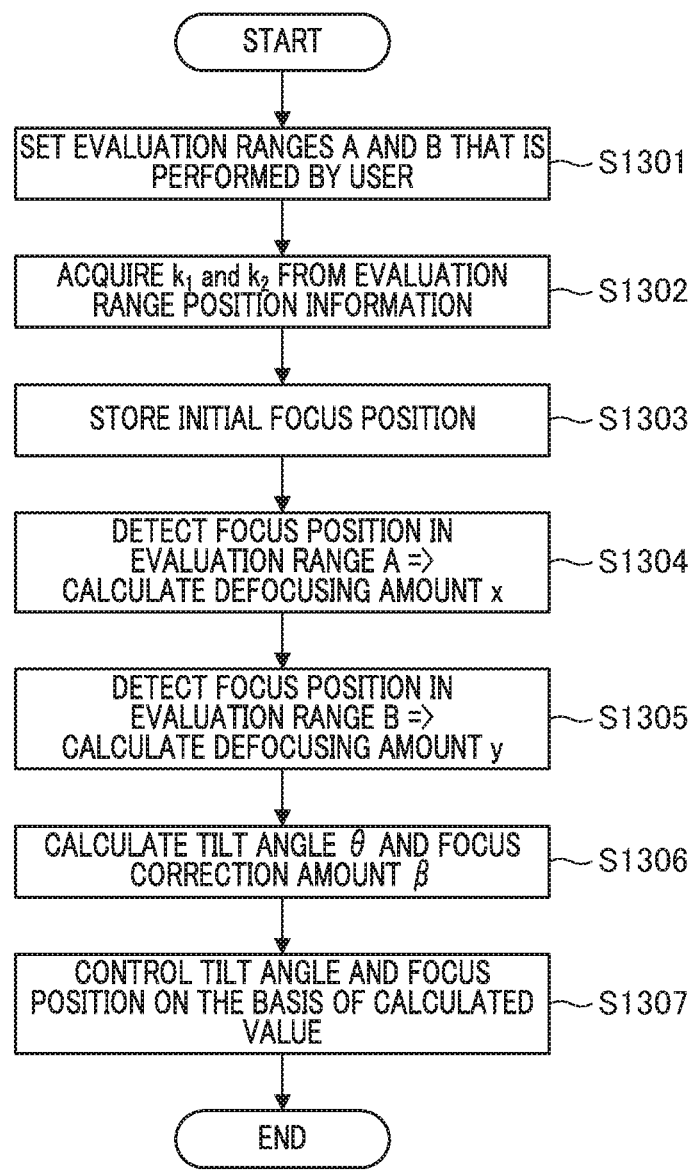
FIG. 13 is a flowchart illustrating one example of a process flow according to Embodiment 3.

FIG. 13 is a flowchart illustrating one example of a process flow according to Embodiment 3.

First, in S1301, as described above, a user sets arbitrary two designation areas including a designation area A (a first area) (1203) and a designation area B (a second area) (1204) as illustrated in FIG. 12. Here, the designation area A will be referred to as an evaluation range A, and the designation area B will be referred to as an evaluation range B.

Next, in S1302, k1 and k2 described in Embodiment 1 are acquired from image heights of the two designation areas (evaluation ranges). In other words, a distance (image height) from the tilt axis passing through the center of the imaging plane of the imaging device 106 to the center of the evaluation range A will be denoted by k1 [μm], and a distance (image height) from the tilt axis to the center of the evaluation range B will be noted by k2 [μm]. In other words, S1302 functions as a position information acquiring unit that acquires position information of the first area from a vertical center of the image screen and position information of the second area from a vertical center of the image screen.

Then, an initial focus position is stored in S1303, an amount of correction (a defocusing amount from the focal plane) x for the evaluation range A is calculated in S1304, and subsequently, an amount of correction (a defocusing amount from the focal plane) y for the evaluation range B is calculated in S1305. In other words, S1303 functions as a defocusing amount detecting unit that detects a defocusing amount of each of the first area and the second area.

The calculation method is the same as described in Embodiment 1.

In S1306, a tilt angle θ and a focus correction amount β are calculated.

The tilt angle θ, as described in Embodiment 1, is acquired as θ=arc tan((x+y)/(k1+k2)) using Equation 6.

On the basis of values of the calculation results described above, tilt control can be performed by controlling the tilt angle and the focus position in S1307.

In this Embodiment 3, although a case in which there are two subjects has been illustrated, by selecting an arbitrary subject from among a plurality of subjects, the subject desired to be focused by the user can be also focused on.

In addition, a process performed in a case in which the number of selected areas is larger than two or the number of selected areas is smaller than two, which has not been described in this embodiment, can be handled by a process similar to that in the case of a plurality of focus positions described in Embodiment 1.

Although the designation areas have a rectangular shape in this embodiment, any designation method and any shape may be employed as long as the purpose of designation of areas can be achieved.

In Embodiments 1 to 3 described above, for example, although a tilt angle of the imaging device is changed in the tilt control, a tilt angle of the lens may be changed. In addition, not only the tilt control in the horizontal direction but also tilt control in a vertical direction may be used.

In addition, in Embodiments 1 to 3 described above, an example in which a calculation result is derived by performing calculation using a CPU or the like using equations has been described. However, instead of calculation using equations, a table corresponding to such equations may be stored in a memory, and a result similar to the calculation result based on the equations may be directly derived using the table.

The present invention is not limited to the embodiments described above, various modifications can be made on the basis of the main concept of the present invention, and such modifications are not intended to be excluded from the scope of the present invention.

In addition, as a part or the whole of the control according to this embodiment, a computer program realizing the function of the embodiment described above may be supplied to the imaging apparatus or the imaging control device through a network or various storage media. Then, a computer (or a CPU, an MPU, or the like) of the imaging apparatus or the image control device may be configured to read and execute the program. In such a case, the program and the storage medium storing the program configure the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-48401 filed on Mar. 15, 2019, and Japanese Patent Application No. 2019-204141 filed on Nov. 11, 2019, which are hereby incorporated by reference herein in its entirety.

What is claimed is:

1. An imaging apparatus comprising:
a hardware processor; and
a memory for storing instructions to be executed by the hardware processor, wherein, when the instructions stored in the memory are executed by the hardware processor, the imaging apparatus functions as:
a tilt control unit configured to perform tilt control by driving at least one of an imaging device and an imaging optical system;
a focus control unit configured to perform focus control by driving a focus lens;
a subject detecting unit configured to detect a subject in an image obtained by the imaging device;
an area acquiring unit configured to acquire position information of each area corresponding to a respective subject detected by the subject detecting unit; and
a determination unit configured to determine a tilt angle and an amount of driving of the focus lens on the basis of the position information of each area in the image and a defocusing amount of each area, wherein the position information includes a distance from a position corresponding to a tilt axis in the image to the area,
wherein the area acquiring unit acquires a number of areas in the image,
wherein in a case in which the number of the areas in the image is one, one of the tilt control and the focus control is performed, and
wherein in a case in which the number of the areas in the image is equal to or larger than two, both the tilt control and the focus control are performed depending on the position information of each area in the image and the defocusing amount of each area.

2. The imaging apparatus according to claim 1, wherein, the defocusing amount corresponds to a distance from a focal plane of the imaging optical system.

3. The imaging apparatus according to claim 1, wherein, the amount of driving of the focus lens is calculated on the basis of sensitivity of the focus lens.

4. The imaging apparatus according to claim 1, wherein, in a case in which there is no subject in the image, a predetermined tilt angle or a predetermined amount of driving of the focus lens is set.

5. The imaging apparatus according to claim 4, wherein the predetermined tilt angle or the predetermined amount of driving of the focus lens is set in advance on the basis of a past history.

6. The imaging apparatus according to claim 1, wherein the tilt control unit performs the tilt control and the focus control unit performs the focus control such that a maximum value of defocusing amounts for a plurality of areas becomes smallest in a case in which the number of the areas in the image is equal to or larger than a predetermined number.

7. The imaging apparatus according to claim 1, wherein the tilt control unit performs the tilt control and the focus control unit performs the focus control such that defocusing amounts for a plurality of areas are within a depth of field in a case in which the number of the areas in the image is equal to or larger than a predetermined number.

8. The imaging apparatus according to claim 1, wherein, when the instructions are executed by the hardware processor, the imaging apparatus further functions as: a distance measuring unit configured to measure a distance to a subject, and
wherein the tilt control unit performs the tilt control and the focus control unit performs the focus control so that a subject relatively close to the imaging device is prioritized in a case in which the number of the areas in the image is equal to or larger than a predetermined number.

9. The imaging apparatus according to claim 6, wherein the predetermined number is three.

10. The imaging apparatus according to claim 1, wherein, when the instructions are executed by the hardware processor, the imaging apparatus further functions as: a communication unit configured to communicate with an external control device through a network.

11. The imaging apparatus according to claim 1, wherein, when the instructions are executed by the hardware processor, the imaging apparatus further functions as: a designating unit that is used for allowing a user to designate the areas in the image.

12. An imaging control method comprising:
performing tilt control by driving at least one of an imaging device and an imaging optical system;
performing focus control by driving a focus lens;
acquiring position information of each area corresponding to a respective subject;
determining a tilt angle and an amount of driving of the focus lens on the basis of the position information of each area in an image and a defocusing amount of each area, wherein the position information includes distance from a position corresponding to a tilt axis in the image to the area; and
acquiring a number of the areas in the image,
wherein in a case in which the number of the areas in the image is one, one of the tilt control and the focus control is performed, and
wherein in a case in which the number of the areas in the image is equal to or larger than two, both the tilt control and the focus control are performed depending on the position information of each area in the image and the defocusing amount of each area.

13. A non-transitory computer readable storage medium storing a computer program causing a computer to execute a control process comprising:
performing tilt control by driving at least one of an imaging device and an imaging optical system;
performing focus control by driving a focus lens;
acquiring position information of each area corresponding to a respective subject;
determining a tilt angle and an amount of driving of the focus lens on the basis of the position information of each area in an image and a defocusing amount of each area, wherein the position information includes distance from a position corresponding to a tilt axis in the image to the area; and acquiring a number of the areas in the image,
wherein in a case in which the number of the areas in the image is one, one of the tilt control and the focus control is performed, and
wherein in a case in which the number of the areas in the image is equal to or larger than two, both the tilt control and the focus control are performed depending on the position information of each area in the image and the defocusing amount of each area.

* * * * *